(12) United States Patent
Bevot

(10) Patent No.: US 9,850,844 B2
(45) Date of Patent: Dec. 26, 2017

(54) UNIVERSAL CONTROL AND EVALUATION UNIT PARTICULARLY FOR OPERATION OF A LAMBDA PROBE

(71) Applicant: Robert Bosch GmbH, Stuttgart (DE)

(72) Inventor: Claudius Bevot, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 72 days.

(21) Appl. No.: 14/911,722

(22) PCT Filed: Aug. 8, 2014

(86) PCT No.: PCT/EP2014/067130
§ 371 (c)(1),
(2) Date: Feb. 11, 2016

(87) PCT Pub. No.: WO2015/022278
PCT Pub. Date: Feb. 19, 2015

(65) Prior Publication Data
US 2016/0201588 A1     Jul. 14, 2016

(30) Foreign Application Priority Data

Aug. 15, 2013 (DE) .................. 10 2013 216 223

(51) Int. Cl.
*F02D 41/14* (2006.01)
*F02D 41/28* (2006.01)
(Continued)

(52) U.S. Cl.
CPC ........... *F02D 41/28* (2013.01); *G01M 15/104* (2013.01); *F01N 11/007* (2013.01);
(Continued)

(58) Field of Classification Search
CPC ................................................ F02D 41/1495
(Continued)

(56) References Cited

U.S. PATENT DOCUMENTS 5,298,865 A * 3/1994 Denz ................... F02D 41/1495
123/694
5,623,913 A * 4/1997 Kitajima ............... F02D 41/008
123/673

(Continued)

FOREIGN PATENT DOCUMENTS

DE   102006022109   11/2007
DE   102008001697   11/2009

(Continued)

OTHER PUBLICATIONS

International Search Report for PCT/EP2014/067130, dated Nov. 17, 2014, 3 pages.*

(Continued)

*Primary Examiner* — Clayton E Laballe
*Assistant Examiner* — Kevin Butler
(74) *Attorney, Agent, or Firm* — Norton Rose Fulbright US LLP; Gerard Messina

(57) ABSTRACT

A control and evaluation unit for the operation and evaluation of at least one sensor, in particular for the operation and evaluation of at least one lambda probe of an internal combustion engine, signal inputs being disposed for the reception of analog measured signals of the at least one sensor, received analog measured signals being digitized by way of an analog/digital converter, a signal transfer unit, by way of which digitized signals are transferred to a calculation unit, being disposed, and provision being made in particular that the signal inputs are switchable by way of a multiplexer.

13 Claims, 2 Drawing Sheets

(51) Int. Cl.
*G01M 15/10* (2006.01)
*F01N 11/00* (2006.01)

(52) U.S. Cl.
CPC ...... *F02D 41/1454* (2013.01); *F02D 41/1494* (2013.01); *F02D 41/1495* (2013.01); *F02D 2041/281* (2013.01); *F02D 2041/283* (2013.01); *F02D 2041/285* (2013.01); *F02D 2041/286* (2013.01)

(58) Field of Classification Search
USPC ...................................................... 73/114.73
See application file for complete search history.

(56) References Cited

U.S. PATENT DOCUMENTS

| | | | | |
|---|---|---|---|---|
| 7,209,066 | B1* | 4/2007 | Trumbo | H03M 1/183 341/141 |
| 7,245,248 | B2* | 7/2007 | Morita | H03M 1/1225 341/155 |
| 2005/0102334 | A1* | 5/2005 | Honda | F02D 41/28 708/202 |
| 2006/0170538 | A1* | 8/2006 | Schnaibel | F02D 41/008 340/438 |
| 2007/0028678 | A1* | 2/2007 | Schnaibel | F01N 11/007 73/114.72 |
| 2008/0053187 | A1* | 3/2008 | Koring | F01N 11/00 73/1.06 |
| 2010/0037683 | A1* | 2/2010 | Barnikow | F02D 41/1495 73/114.72 |
| 2010/0281854 | A1* | 11/2010 | Huang | F02D 41/1495 60/276 |
| 2011/0184700 | A1* | 7/2011 | Michalske | F02D 41/1495 702/182 |
| 2012/0222474 | A1* | 9/2012 | Plonka | F02D 41/1454 73/114.69 |
| 2014/0358355 | A1* | 12/2014 | Zimmerschied | F02D 41/1495 701/31.1 |
| 2015/0047411 | A1* | 2/2015 | Ledermann | F02D 41/1456 73/1.06 |
| 2015/0047415 | A1* | 2/2015 | Michalske | F02D 41/1454 73/23.31 |

FOREIGN PATENT DOCUMENTS

| | | | | |
|---|---|---|---|---|
| DE | 102010000663 | | 7/2011 | |
| DK | DE102008001697 | * | 11/2009 | ........... G01N 27/419 |
| EP | 2 022 966 | | 2/2009 | |
| GB | 2 052 193 | | 1/1981 | |
| JP | S57147710 | | 9/1982 | |
| JP | H04185114 A | | 7/1992 | |
| JP | H05313785 A | | 11/1993 | |
| JP | 2003110427 A | | 4/2003 | |
| JP | 2003174363 A | | 6/2003 | |
| JP | 2011520112 | * | 7/2011 | ........... G01N 27/419 |

OTHER PUBLICATIONS

Written Opinion of the ISA for PCT/EP2014/067130, dated Nov. 17, 2014, 8 pages.*
International Search Report for PCT/EP2014/067130, dated Nov. 17, 2014.

* cited by examiner

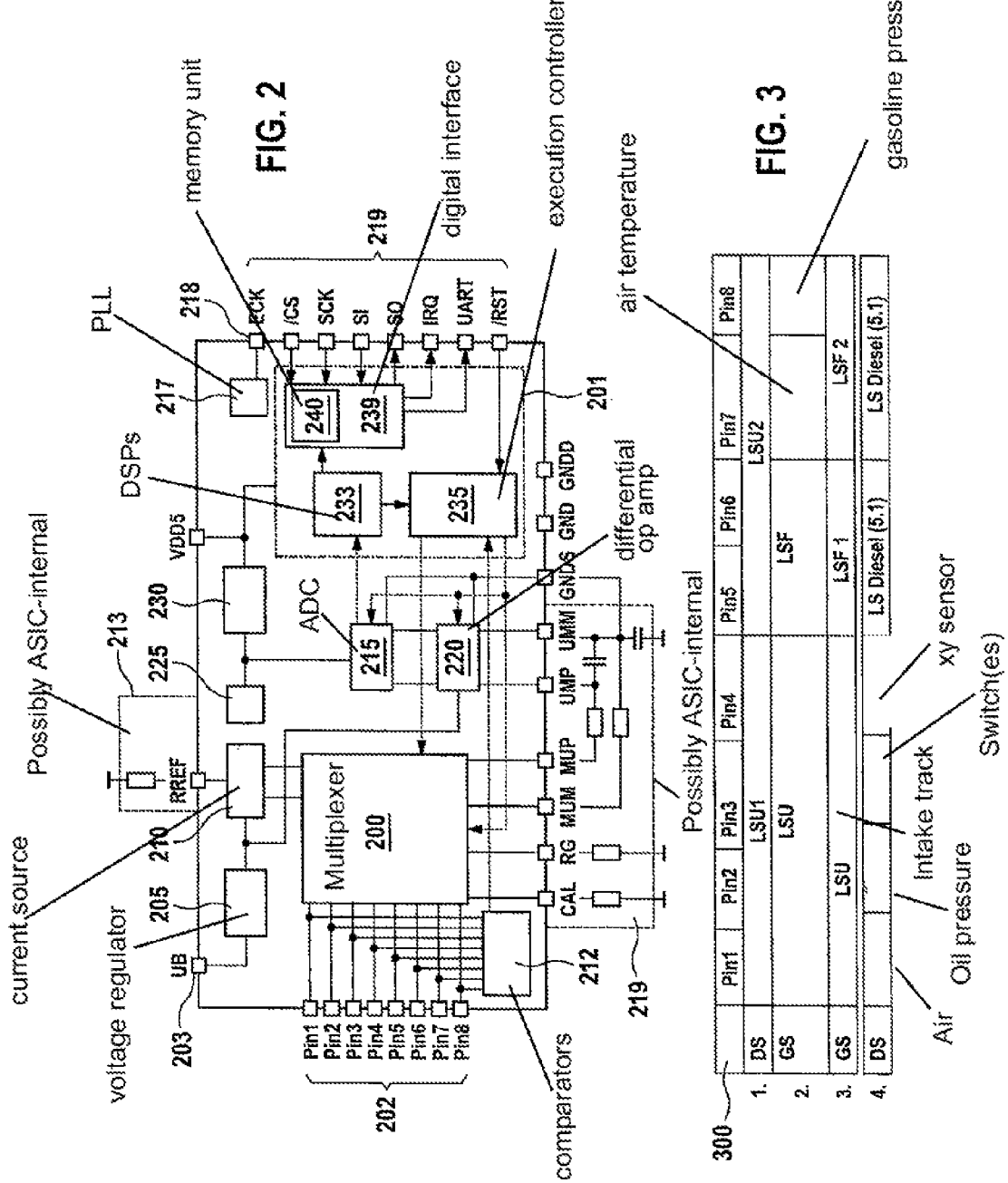

UNIVERSAL CONTROL AND EVALUATION UNIT PARTICULARLY FOR OPERATION OF A LAMBDA PROBE

FIELD

The present invention relates to a control and evaluation unit for the operation and evaluation of one or more sensors, in particular for the operation and evaluation of at least one lambda probe of an internal combustion engine.

BACKGROUND INFORMATION

A control unit for the operation of a broadband lambda probe is described in German Patent Application No. DE 10 2008 001 697 A1. "Operation" encompasses in particular control of the lambda probe, as well as evaluation of the signals or data supplied by the lambda probe. The control unit encompasses a signal conditioning unit, an analog/digital (A/D) converter, a pump current controller, a digital interface, a controller, a pump current source, an internal pump electrode terminal, an external pump electrode terminal, and a reference electrode terminal. The signal conditioning unit is provided in order to ascertain an actual value for the pump current controller, and to ascertain further information regarding the operating state of the broadband lambda probe. The further information regarding the operating state of the broadband lambda probe is outputtable via the digital interface.

A corresponding control unit, in the form of an integrated circuit (IC) for controlling broadband lambda probes suitable for diesel and gasoline engines, is marketed by the Applicant under the designation "CJ135". This control unit is described below with reference to FIG. 1.

With an aforesaid control unit, only one lambda probe of a specific probe type can respectively be controlled, evaluated, or diagnosed. For the operation of at least two lambda probes of different probe types, a corresponding number of different control units is therefore required.

In addition to the aforesaid control system for lambda probes, a plurality of further control units specialized for a particular application are encountered nowadays in internal combustion engines or in motor vehicles equipped with such internal combustion engines. An internal combustion engine is furthermore operated, in a conventional manner, by way of an engine control device. These control units or control devices possess analog and digital inputs that in part also provide additional functions such as a pull-up/pull-down structure, or a voltage divider required, for example, for the evaluation of temperature sensors. The evaluation circuits on which these are based can be made up of discrete components or, by combining multiple inputs and outputs, of individual application-specific integrated circuits (ASICs).

A separate control unit having a specific logic circuit is required for each of these different applications, so that in the event of a change in function, the hardware of the logic circuit must be adapted or an installed reserve must be provided on the respective circuit board layout.

SUMMARY

The control and evaluation unit according to the present invention, preferably embodied as an ASIC, is universally usable for the operation and evaluation of one or more external sensors. The control unit has only a single evaluation and measurement unit whose inputs, or whose current/signal switches connected to the inputs, can be flexibly wired by way of a multiplexer and can thus furnish a universal measurement assemblage that is adaptable to different sensor types with no need for hardware modifications.

In addition to the aforesaid evaluation and measurement unit, the control and evaluation unit can have a stimulation unit (e.g. a current source) whose inputs, or whose current/signal switches connected to the inputs, can likewise be flexibly wired by way of the multiplexer.

The sensor signals, e.g., electrical voltages or currents, present at the signal inputs of the control and evaluation unit can be produced without active or controlled excitation by the control unit, or can be excited by an excitation, e.g., a current, that is defined in terms of time and magnitude, and detected or measured in a predefined time frame. A corresponding exemplifying embodiment can be a binary response measurement.

Different voltage or current measurements can therefore be carried out at the inputs of the aforesaid evaluation and measurement unit, and different excitations can moreover be performed by way of the optional stimulation unit. For this purpose, the multiplexer can enable those inputs of the measurement unit which are required for the respective sensor-specific voltage measurement or current measurement. The signals detected by the measurement unit are preferably transferred digitally to an external calculation unit, e.g., a microcontroller, in order to perform further processing using an evaluation program implemented therein.

The multiplexer can be operated using the time multiplexing method, the switching frequency being adjustable. This allows a saving in conductive lead resources, since the same leads can be used for different signals.

Current switches provided in the measurement unit for the aforesaid excitation of a sensor, and/or signal switches, can also be correspondingly controlled in terms of time by way of an adjustable or programmable execution control system for the particular application.

The present invention may yield some cost advantages, since the evaluation of, for example, two probes can be accomplished with only one ASIC rather than with two ASICs, and only one component needs to be populated and checked in the context of production and quality testing of the ASICs. In addition, there is a corresponding saving in electricity costs.

Advantages may also be obtained in terms of flexibility, since fewer hardware variants are required because the necessary adaptations to the various sensors are accomplished exclusively by program-engineering switchover.

An example control unit according to the present invention allows the operation, e.g., control and/or measurement and/or evaluation and/or diagnosis, of at least two sensors of different designs that are evaluated by way of a voltage or current measurement. These sensors are preferably sensors of a compression-ignition or spark-ignition internal combustion engine, in particular at least two lambda probes of different probe types, which are used for exhaust gas post-processing in such an internal combustion engine. The example control unit according to the present invention is preferably implemented in the form of an aforesaid ASIC module.

With the present invention, all types and combinations of lambda probes, e.g. broadband lambda probes, binary probes, or single- and double-cell probes, can be operated with only one control unit as well as external wiring, with no need for hardware repopulation. Different or additional sensors required for combustion control, such as temperature sensors or fuel pressure sensors of a fuel reservoir (common rail), can also be operated with the control unit.

Further advantages and embodiments of the present invention are described below and are show in the figures. It is understood that the features described above and those explained below are usable not only in the respective combination indicated, but also in other combinations or in isolation, without departing from the scope of the present invention.

BRIEF DESCRIPTION OF THE DRAWINGS

FIG. 2 shows an example control unit for operation of a broadband lambda probe, according to the present invention.

FIG. 3 shows an exemplifying pin configuration of a control unit according to FIG. 2.

DETAILED DESCRIPTION OF EXAMPLE EMBODIMENTS

Figure 1:
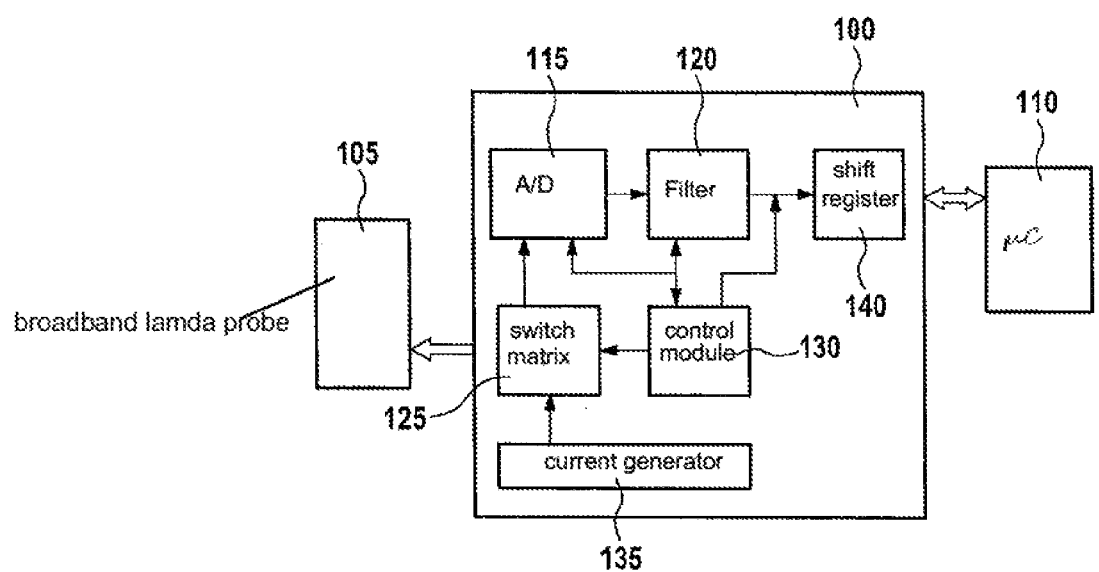
FIG. 1 shows a conventional control unit for operation of a broadband lambda probe.

Control unit 100 shown in FIG. 1 and conventional in terms of its configuration (IC recited previously, having the designation "CJ135") corresponds in terms of its functionality to an evaluation module for a broadband lambda probe. The control unit is therefore connected in terms of signal engineering or data engineering to a broadband lambda probe 105. A signal connection additionally exists to an external microcontroller (µC) 110.

Control unit 100 encompasses an analog/digital (A/D) converter 115, a filter 120, and a serial peripheral interface (SPI) shift register 140. The analog measured data supplied by lambda probe 105 are digitized by way of A/D converter 115 for further digital processing. The signal noise of the measured signal supplied by the sensor is decreased by way of filter 120, preferably a low pass filter. The digital data filtered in this manner are transferred to microcontroller 110.

Control unit 100 furthermore encompasses a switch matrix 125 that is operated by way of a control module 130 and is powered by a current generator 135. The inputs of the control unit, as well as the manner in which the measured signals are evaluated, can be flexibly adapted or modified using switch matrix 125.

The universal control unit shown in FIG. 2 has an analog first circuit part, as well as a digital second circuit part that is delimited by dashed line 201 from the components of the analog circuit part.

The analog circuit part encompasses in particular a multiplexer 200 connected to, in the present case, eight inputs or pins 202 (Pin1 to Pin8) leading outward. In the present exemplifying embodiment, the multiplexer is made up of high-impedance signal switches that connect the measurement unit to the measured signals supplied by lambda probe 105, as well as low-impedance current switches that enable excitation of the structures, e.g., a lambda sensor 105, connected externally to pins 202. In this exemplifying embodiment the multiplexer operates in accordance with a conventional time multiplexing method, in the present case with an adjustable switching frequency. Conductive lead resources are advantageously economized as a result of time multiplexing, since the same leads can be used for different signals.

The universal control unit or evaluation circuit can carry out different voltage measurements at the (in the present case) eight pins 202, both differentially and with ground reference.

The evaluation circuit or measurement unit encompasses a low pass filter that is implemented either in ASIC 213 or externally, a signal measurement amplifier having an adjustable gain (in the present exemplifying embodiment a differential operational amplifier 220), and an A/D converter 215. The digitized signals are transferred to a calculation unit, present e.g. in an engine control device, so that further processing can be performed with the aid of a suitable evaluation program. In the present exemplifying embodiment the calculation unit is an externally disposed microcontroller 110. It is to be emphasized, however, that the digital signal processor (DSP) 233 disposed in the control device, or the like, can take on this functionality in place of an external calculation unit.

Additionally disposed in the analog circuit part is a voltage regulator 205 for stabilizing the supply voltage (UB) 203, which in the present case is stabilized by way of a reference voltage 213 (e.g., a bandgap) provided in an external ASIC as well as a current source 210 connected thereto. A switch matrix 219 having current and voltage switches (CAL, RG, MUM, MUP, etc.) is provided in the lower region of the circuit assemblage shown. One or more voltage comparators 212 serve for pin monitoring. A phase-locked loop (PLL) 217 is additionally provided in order to generate an internal clock cycle from a reference clock cycle, furnished by the microcontroller via terminal 218 (ECK), with which the control unit is synchronizable with microcontroller 110.

Digital circuit part 201 encompasses in particular a digital signal processor (DSP) 233 as well as an execution controller 235. DSP 233 and/or execution controller 235 either are preprogrammed electronically (i.e., as hardware) and are configurable via, for example, an aforesaid SPI shift register, or are embodied programmably, for example by way of a flash memory. Permanent connection or free programmability can also be implemented in portions of the overall circuit or by combining the two variants.

Digital circuit part 201 further encompasses a memory unit 240 for buffering, in particular, data corresponding to the detected sensor signals. These data can thus be retrieved from memory unit 240 for internal further processing, for example by way of DSP 233, or for transfer to microcontroller 110.

One or more digital data interfaces 239 to microcontroller 110, and for configuring the control unit, are additionally provided in digital circuit part 201. This can involve a usual data bus or a conventional point-to-point connection. According to a first variant, a 1×SPI bus can be provided for data transfer to microcontroller 110 and for configuration of the control unit. In a second variant, a 1×SPI having a relatively low transfer speed can be provided for configuration of the control unit, as well as a fast transfer section (e.g., asynchronous transfer via a universal asynchronous receiver-transmitter (UART), the pump current controller being implemented in microcontroller 110.

Digital circuit part 201 can be implemented by way of an ASIC that communicates with the analog components as described herein. One or two DSPs 233, which can process the measured data of the sensors digitized by way of ADC 215, are then located in the ASIC. These DSPs 233 can be configured, for example, as pump current controllers for broadband lambda probes.

It is noteworthy that the requirements in terms of the performance of these internal DSPs 233 can be reduced by the fact that certain measured data are transferred quickly via digital interface 239, or via a dedicated point-to-point connection, to microcontroller 110 and processed therein.

The resulting information produced by this external processing is then sent back to ASIC 201. This variant requires latency that is as short as possible in the transfer and processing of the data. As just described, an aforesaid pump current controller can in this manner, for example, be displaced out to microcontroller 110. As likewise described, combinations of the two approaches are possible here as well, i.e., in the case of, for example, two pump current controllers (as shown in FIG. 3, in particular wiring example 1 therein, e.g., for an internal and external pump electrode), one of these controllers can be embodied in ASIC 201 and the other in the external microcontroller.

The analog inputs via the (in the present case) eight pins 202 can be wired or operated as follows:
 a. Voltage measurement, controlled by execution controller 235;
 b. Signal generation, e.g. as current source or pull-down source, controlled by execution controller 235;
 c. Protection from electrostatic discharge (ESD);
 d. Monitoring of pin voltage, e.g. for short-circuit recognition;
 e. Switching one or more pins 202 to high impedance in the event of a fault;
 f. Furnishing voltage protection for pins 202 against overvoltage.

The universal control unit is connected via outputs 218, 219 to the aforesaid microcontroller 110 disposed outside the control unit. The microcontroller is preferably housed in a control device of the internal combustion engine, e.g., an engine control device.

The control device according to FIG. 2 can thus be understood as a further development of the control unit shown in FIG. 1 and thus preferably possesses, in all properties and functionalities, at least the performance of the control unit shown in FIG. 1, added to which is the above-described flexibility thanks to variation of the wiring of the inputs and outputs (FlexI/O) and thanks to flexible programmability by way of execution controller 235.

FIG. 3 is a table showing examples of possible wiring combinations or pin configurations of a control unit shown in FIG. 2 and implemented in only one ASIC. The four examples 1. to 4. shown in the table encompass, as shown in column 1, both applications in the sector of compression-ignition diesel engines (diesel systems=DS) and spark-ignition Otto-cycle engines operated with gasoline (gasoline systems=GS).

In configuration example 1. (for a diesel engine) pins 1 to 4 serve to supply power to and to detect data or a signal of an internal pump electrode (LSU1) of a broadband lambda probe, and pins 5 to 8 serve correspondingly to supply power to and to detect a signal of an external pump electrode (LSU2) of the lambda probe.

In configuration example 2. (for a gasoline engine) pins 1 to 4 again serve to supply power to and to detect a signal of pump electrodes of a broadband lambda probe (LSU), i.e. in the present case both an external and an internal pump electrode; pins 5 and 6 serve to supply voltage or current to and to detect a signal of binary probe (LSF); pin 7 serves to detect a signal of a temperature sensor for detecting the air temperature; and pin 8 serves to detect a signal of a pressure sensor for detecting the fuel pressure in a common rail system that may be present.

In configuration example 3. (again for a gasoline engine) pins 1 to 4 serve to supply voltage or current to and to detect a signal of a broadband lambda probe (LSU) disposed in the intake tract of the gasoline engine; pins 5 and 6 serve to supply voltage or current to and to detect a signal of an internal pump electrode (LSF1) of a binary probe; and pins 7 and 8 serve to supply voltage or current to and to detect a signal of an external pump electrode (LSF2) of the binary probe.

In configuration example 4. (for a diesel engine) pin 1 serves to detect a signal of an air mass sensor; pin 2 to detect a signal of an oil pressure sensor; pin 3 to detect a signal of the position of a switch, e.g., of a climate control system switch; pin 4 to detect a signal of (any) further sensor. In the present example, pins 5 and 6 as well as 7 and 8 serve to supply voltage or current to and to detect a signal of a broadband lambda probe. The "LSU 5.1" probe type that is shown corresponds to a single-cell broadband probe especially suitable for diesel engines.

As a result of the flexibility, illustrated in FIG. 3, in terms of wiring of the control unit according to the present invention, it and the encompassed evaluation circuit can be adapted to new sensors and their requirements with no need to modify the electronics or logic (i.e., hardware) of the control unit.

What is claimed is:

1. A control and evaluation unit for the operation and evaluation of at least two sensors, comprising:
 signal inputs of the at least two sensors to receive analog measured signals of the at least two sensors;
 an analog/digital converter to provide digitized signals of the received analog measured signals;
 a signal transfer unit to transfer the digitized signals to the calculation unit; and
 a multiplexer to switch the signal inputs of the at least two sensors.

2. The control and evaluation device as recited in claim 1, wherein the at least two sensors sensor includes at least one lambda probe and at least one of another lambda probe and another external sensor of an internal combustion engine.

3. The control and evaluation unit as recited in claim 1, wherein the control and evaluation unit is configured to excite the received analog measured signals of the at least two sensors by an excitation signal defined in terms of at least one of time-related behavior and signal magnitude.

4. The control and evaluation unit as recited in claim 3, wherein the control and evaluation unit is configured to detect and evaluate within a predefined time window, a binary response, produced by excitation of the at least two sensors.

5. The control and evaluation unit as recited in claim 4, wherein those signal inputs which are required for a sensor-specific at least one of electrical voltage measurement and current measurement are enabled by the multiplexer.

6. The control and evaluation unit as recited in claim 5, wherein the multiplexer is operated using a time multiplexing method.

7. The control and evaluation unit as recited in claim 6, wherein a switching frequency of the multiplexer is adjustable.

8. The control and evaluation unit as recited in claim 1, wherein the calculation unit includes a digital signal processor disposed in the control and evaluation unit, by which the digitized measured signals are evaluated.

9. The control and evaluation unit as recited in claim 1, wherein the calculation unit is disposed outside the control and evaluation unit, and evaluates the digitized signals transferred to it and sends the results of the evaluation back to the control unit.

10. The control and evaluation unit as recited in claim 1, further comprising:

at least one of current switches and signal switches, which are controllable over time by an adjustable or programmable execution controller.

11. The control and evaluation unit as recited in claim 10, wherein at least one of the current switches and signal switches are configurable by a switch matrix.

12. The control and evaluation unit as recited in claim 1, further comprising:
a clock unit, the clock unit being synchronizable with the calculation unit via an internal clock, the internal clock generated based on a reference clock using a phase-locked loop, wherein the calculation unit is external to the control and evaluation unit.

13. The control and evaluation unit as recited in claim 1, further comprising:
a data memory to buffer data corresponding to the detected sensor signals is disposed.

* * * * *